US008879912B2

(12) United States Patent
Kozaki et al.

(10) Patent No.: US 8,879,912 B2
(45) Date of Patent: Nov. 4, 2014

(54) BANDWIDTH CONTROL METHOD, COMMUNICATION SYSTEM, AND COMMUNICATION DEVICE

(75) Inventors: Seiji Kozaki, Tokyo (JP); Takashi Nishitani, Tokyo (JP); Masaki Tanaka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 16 days.

(21) Appl. No.: 13/522,992

(22) PCT Filed: Jan. 28, 2010

(86) PCT No.: PCT/JP2010/051152
§ 371 (c)(1),
(2), (4) Date: Jul. 19, 2012

(87) PCT Pub. No.: WO2011/092822
PCT Pub. Date: Aug. 4, 2011

(65) Prior Publication Data
US 2012/0301145 A1 Nov. 29, 2012

(51) Int. Cl.
*H04B 10/20* (2006.01)
*H04B 10/08* (2006.01)
*H04B 10/00* (2013.01)
*H04J 14/00* (2006.01)
*H04L 12/12* (2006.01)
*H04L 12/911* (2013.01)
*H04Q 11/00* (2006.01)

(52) U.S. Cl.
CPC ............... *H04L 12/12* (2013.01); *Y02B 60/34* (2013.01); *H04Q 2011/0064* (2013.01); *H04L 47/781* (2013.01); *H04Q 11/0067* (2013.01); *H04Q 2011/0079* (2013.01); *Y02B 60/32* (2013.01)
USPC .................... 398/58; 398/38; 398/40; 398/70

(58) Field of Classification Search
CPC . H04J 14/0221; H04J 14/0282; H04J 3/1694; H04J 14/0247; H04J 14/0252

USPC ............................................ 398/38, 58, 40, 70
See application file for complete search history.

(56) References Cited

U.S. PATENT DOCUMENTS 6,574,019 B1* 6/2003 Harada ........................... 398/99
2003/0048805 A1* 3/2003 Yoshihara et al. ............ 370/468
(Continued)

FOREIGN PATENT DOCUMENTS

CN 1859438 A 11/2006
CN 101562760 A 10/2009
(Continued)

OTHER PUBLICATIONS

Combined Office Action and Search Report issued Jun. 28, 2013 in Taiwanese Patent Application No. 100101062 with English translation and English translation of categories of cited documents.

(Continued)

*Primary Examiner* — David Payne
*Assistant Examiner* — Pranesh Barua
(74) *Attorney, Agent, or Firm* — Oblon, Spivak, McClelland, Maier & Neustadt, L.L.P.

(57) ABSTRACT

A bandwidth control method used in a case where, for example, a first communication device (OLT) allocates a bandwidth for signal transmission to each of a plurality of second communication devices (ONUs) connected to the OLT in a communication system having the OLT and the ONUs includes a sleep controlling of shifting devices among the ONUs that satisfy a predetermined condition into a power saving state, a control-target selecting of selecting control target devices among the ONUs based on a result of performing the sleep controlling, and a bandwidth determining of determining a bandwidth to be allocated to the selected control target devices.

21 Claims, 12 Drawing Sheets

(56) References Cited

U.S. PATENT DOCUMENTS

| | | | |
|---|---|---|---|
| 2004/0252714 A1* | 12/2004 | Oh et al. | 370/437 |
| 2005/0019033 A1* | 1/2005 | Oh et al. | 398/58 |
| 2008/0186935 A1 | 8/2008 | Ling et al. | |
| 2008/0212964 A1* | 9/2008 | Gao et al. | 398/58 |
| 2008/0273552 A1 | 11/2008 | Kim et al. | |
| 2009/0213874 A1* | 8/2009 | Levit | 370/468 |
| 2009/0263127 A1* | 10/2009 | Haran et al. | 398/38 |
| 2010/0080558 A1* | 4/2010 | Kazawa et al. | 398/66 |
| 2010/0111523 A1* | 5/2010 | Hirth et al. | 398/25 |
| 2010/0208747 A1* | 8/2010 | Gordon et al. | 370/468 |
| 2010/0322074 A1* | 12/2010 | Nakahira | 370/235 |
| 2011/0318009 A1* | 12/2011 | Shiba | 398/67 |
| 2012/0213518 A1* | 8/2012 | Tamai et al. | 398/58 |
| 2012/0251115 A1* | 10/2012 | Sarashina et al. | 398/72 |

FOREIGN PATENT DOCUMENTS

| | | |
|---|---|---|
| JP | 2000 196557 | 7/2000 |
| JP | 2003 87283 | 3/2003 |
| JP | 2005 12834 | 1/2005 |
| JP | 2009 212682 | 9/2009 |
| JP | 2009 260970 | 11/2009 |
| TW | 200913590 A | 3/2009 |
| TW | 200931905 A | 7/2009 |
| WO | WO 2009/110429 A1 | 9/2009 |

OTHER PUBLICATIONS

International Search Report Issued in Apr. 20, 2010 PCT/JP10/51152 Filed Jan. 28, 2010.

Office Action issued Oct. 30, 2013 in Korean Patent Application No. 10-2012-7022057 with English language translation.

Combined Office Action and Search Report issued Jan. 10, 2014 in Chinese Patent Application No. 201080039869.7 with partial English language translation.

Office Action issued Jun. 3, 2014 in Chinese Patent Application No. 201080039869.7 (with partial English Translation).

* cited by examiner

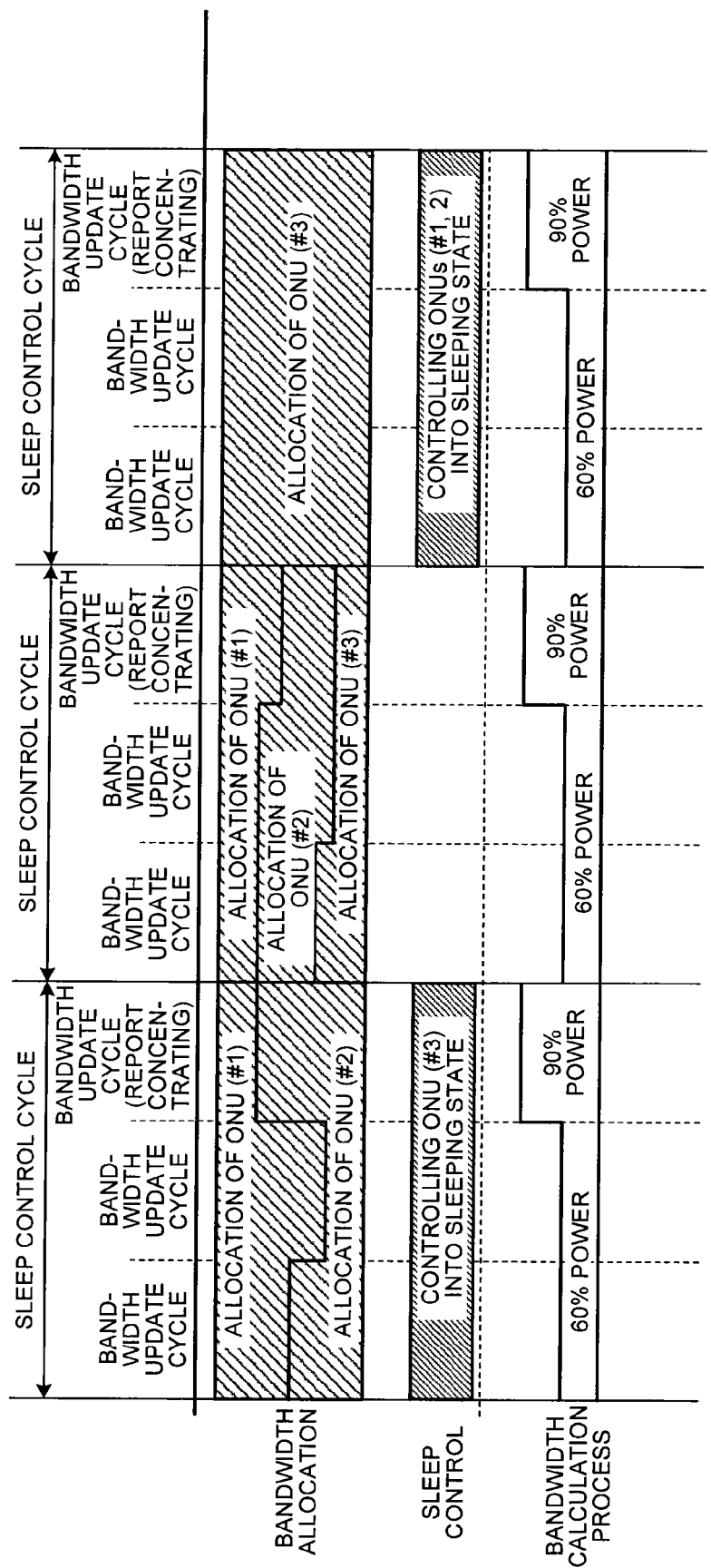

BANDWIDTH CONTROL METHOD, COMMUNICATION SYSTEM, AND COMMUNICATION DEVICE

FIELD

The present invention relates to a communication device that includes a bandwidth control function, and relates to, for example, a bandwidth control method in a case where a master station device (a station-side communication device) allocates bandwidths to a plurality of slave station devices (subscriber-side communication devices) in a communication system constituted by connection of the slave station devices to the master station device.

BACKGROUND

A conventional bandwidth control method for a communication system configured to include a plurality of slave station devices and a master station device that accommodates therein these slave station devices is a method of using a control such as that to dynamically distribute upstream bandwidths to the slave station devices that request bandwidth allocation in proportion to contract bandwidth ratios of subscribers that use the respective slave station devices.

For example, a communication system described in Patent Literature 1 mentioned below is configured to allocate bandwidths to slave station devices based on not only contract bandwidths of subscribers but also an accumulated value of bandwidths previously allocated to the slave station devices or that of data previously transmitted to the slave station devices so as to distribute upstream bandwidths to the slave station devices in proportion to the contract bandwidth ratios of the subscribers, respectively.

CITATION LIST

Patent Literature

Patent Literature 1: Japanese Patent Application Laid-open No. 2003-87283

SUMMARY

Technical Problem

In recent years, power saving of devices has been actively studied. As one of measures for realizing power saving, it is considered to apply a power saving control to make slave station devices that are not performing any communication into a power saving operation state.

However, with the conventional bandwidth control described above, even when slave station devices that are not performing any communication are controlled into a power saving state, bandwidth allocation is made based on contract bandwidths of subscribers that use the corresponding slave station devices. Specifically, a guaranteed minimum bandwidth is set to each of the subscribers, the total value of the guaranteed minimum bandwidths for the subscribers is subtracted from the entire bandwidths, and the remaining bandwidths are dynamically allocated to the respective slave station devices. Accordingly, when the power saving control is applied to the communication system that implements the conventional bandwidth control described above, the bandwidths corresponding to the total of the guaranteed minimum bandwidths secured for the slave station devices that are in a power saving state and to which upstream data is not transmitted are wasted. As a result, there is a problem that it is impossible to realize effective use of bandwidths.

For example, it is assumed that 32 slave station devices are connected to one master station device, and a guaranteed minimum bandwidth of 10 Mbps is set for each of the slave station devices as a contract bandwidth in an optical access system based on GE-PON (Gigabit Ethernet® Passive Optical Network) having transmission bandwidths of 1 Gbps and compliant with IEEE802.3. In this case, if half of the 32 slave station devices, that is, 16 slave station devices are in a power saving state, bandwidths of 160 Mbps that are nearly 16% of the entire bandwidths (1 Gbps) remain unused.

The present invention has been achieved in view of the above problems, and an object of the present invention to provide a bandwidth control method, a communication system, and a communication device that can improve bandwidth utilization efficiency as compared to conventional techniques.

It is also an object of the present invention to provide a bandwidth control method, a communication system, and a communication device that can achieve effective use of bandwidths even when slave station devices that can shift into a power saving state are present, and that can ensure fairness of allocation of bandwidths to the respective slave station devices.

Solution to Problem

In order to solve the above problem and in order to attain the above object, a bandwidth control method of the present invention used in a case where a first communication device allocates a bandwidth for signal transmission to each of a plurality of second communication devices connected to the first communication device in a communication system having the first communication device and the second communication devices, includes: a sleep controlling step of shifting devices among the second communication devices that satisfy a predetermined condition into a power saving state; a control-target selecting step of selecting control target devices among the second communication devices based on a result of performing the sleep controlling step; and a bandwidth determining step of determining a bandwidth to be allocated to the selected control target devices.

Advantageous Effects of Invention

The bandwidth control method according to the present invention can realize effective use of transmission bandwidths.

BRIEF DESCRIPTION OF DRAWINGS

FIG. 16 is an example of a result of bandwidth allocation in a case where a control according to the fourth embodiment is applied.

DESCRIPTION OF EMBODIMENTS

Exemplary embodiments of a bandwidth control method and a communication device according to the present invention will be explained below in detail with reference to the accompanying drawings. The present invention is not limited to the embodiments.

First Embodiment

In a first embodiment of the present invention, a bandwidth control method applied to a PON optical communication system is described by way of example.

Figure 1:
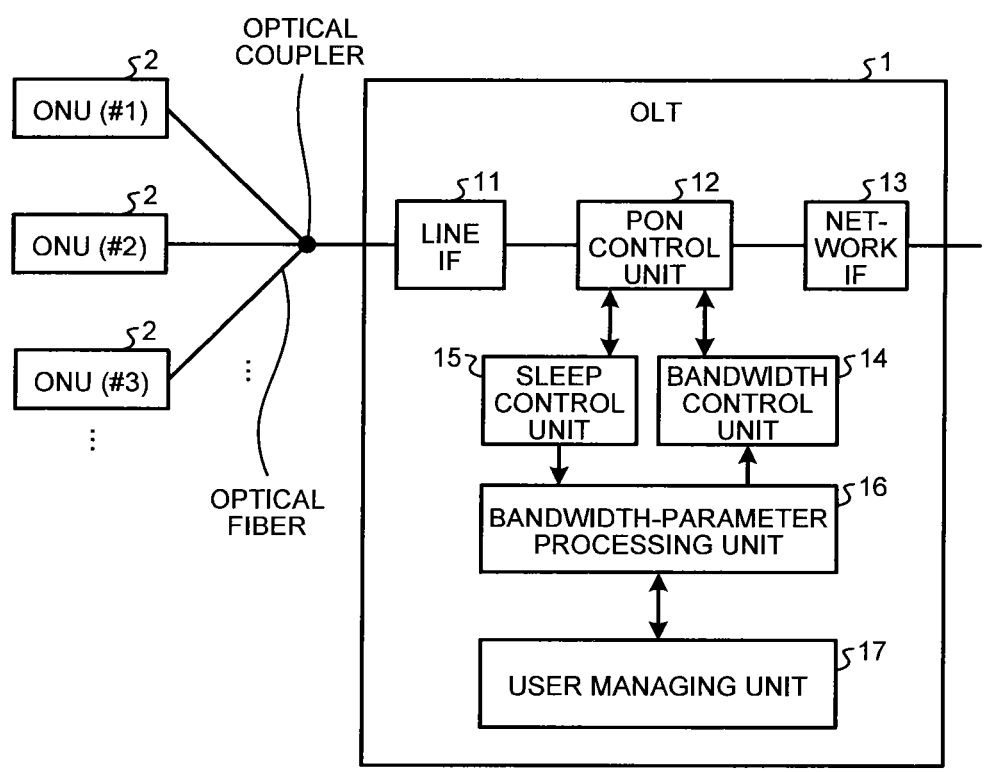
FIG. 1 is a configuration example of a communication system to which a bandwidth control method according to a first embodiment is applied.

FIG. 1 is a configuration example of a communication system to which the bandwidth control method according to the first embodiment is applied. FIG. 1 also depicts a configuration example of a master station device that implements the bandwidth control. This communication system includes an OLT (Optical Line Terminal) 1 that serves as the master station device and a plurality of ONUs (Optical Network Units) 2 that serve as slave station devices. Each of the ONUs 2 is connected to the OLT 1 via an optical fiber and an optical coupler. Each ONU 2 transmits a bandwidth allocation request to the OLT 1 when transmitting data to the OLT 1. The ONU 2 transmits the data to the OLT 1 in a bandwidth (a period of time in which the ONU 2 can transmit the data) allocated by the OLT 1 as a result of the request. Furthermore, each ONU 2 shifts into a power saving state where power consumption is kept lower than that in a normal operation in response to an instruction from the OLT 1, and does not transmit upstream data in this power saving state. For example, each ONU 2 shifts into a power saving state by a control implemented to stop supplying electric power to each device used only in a data transmitting operation or to cause the device to operate in a low power consumption mode when the device includes a function to operate in the low power consumption mode.

In the present embodiment, the communication system is described on an assumption that all the ONUs 2 in the system can shift into a power saving state for the brevity of description. However, the bandwidth control method to be described later is applicable even to a case where only a part of the ONUs 2 (one or more ONUs 2) includes the function to shift into a power saving state. Furthermore, the bandwidth control method is also applicable to a system in which one or more ONUs 2 that shift not into a power saving state but a state where the ONUs 2 do not simply transmit upstream data.

A configuration of the OLT 1 and an operation performed by the OLT 1 are described next with reference to FIGS. 2 to 4 as well as FIG. 1.

As shown in FIG. 1, the OLT 1 includes, as a main-data transmission system, a line IF 11 that terminates an interface with each of the ONUs 2, a PON control unit 12 that controls communication with each of the ONUs 2, and a network IF 13 that terminates an interface with a higher network. The OLT 1 also includes a bandwidth control unit 14 that controls an upstream bandwidth of each of the ONUs 2, a sleep control unit 15 that implements a sleep control that is a control to shift each ONU 2 into a power saving state, a bandwidth-parameter processing unit 16 that generates parameters used in the upstream bandwidth allocation made by the bandwidth control unit 14, and a user managing unit 17 that manages a contract bandwidth or the like of a subscriber that uses each ONU 2. The bandwidth control unit 14 and the bandwidth-parameter processing unit 16 constitute a bandwidth allocating unit.

In the OLT 1 configured as described above, the line IF 11, the PON control unit 12, and the network IF 13 that constitute the main-data transmission system establish a transmission link for connecting each ONU 2 to the higher network to perform communication therebetween by performing processes according to protocols corresponding to the interfaces to be used.

The sleep control unit 15 acquires information on a line utilization state of each ONU 2 from the PON control unit 12, and implements a sleep control on the ONU 2 based on this information. As a control method, a method instructing the PON control unit 12 to transmit a signal instructing a sleep start time and a sleep time to the ONU 2, for example, is considered as described in IEEE802.3 Interim Meeting handout, "EPON Power saving via Sleep Mode (3av_0809_mandin_4.pdf)", pages 4 and 5. When detecting the ONU 2 that satisfies a predetermined condition, the sleep control unit 15 determines to shift this ONU 2 into a power saving state. The sleep control unit 15 instructs the PON control unit 12 to transmit the signal instructing the sleep start time and the sleep time to this ONU 2. For example, it is assumed that the ONU 2 that satisfies the predetermined condition is the ONU 2 the line utilization state information on which acquired from the PON control unit 12 indicates that the ONU 2 has not transmitted upstream data (has not used upstream data) for a certain period of time. Alternatively, the ONU 2 that has transmitted a signal indicating that the ONU 2 desires to shift into a power saving state or the like can be set as the ONU 2 that satisfies the predetermined condition. Furthermore, it is possible to combine these conditions. For example, when detecting the ONU 2 that has not used an upstream line for a certain period of time or receiving a signal indicating that the ONU 2 desires to shift into a power saving state, the sleep control unit 15 shifts the corresponding ONU 2 into a power saving state.

The ONU 2 that is instructed to shift into a power saving state shifts into a power saving state, and then returns into a normal operation state (a non-power saving state) when satisfying the predetermined condition. When a shifting period of shifting into a power saving state is designated in the instruction to shift into the power saving state, the ONU 2 returns into a non-power saving state at least when this shifting period (corresponding to a sleep control cycle to be described later) is over. Furthermore, the ONU 2 determines whether to return into a non-power saving state when the ONU 2 operates to receive the signal transmitted from the OLT 1 even in a power saving state and receives a transmission permission signal (a signal for allocating an upstream bandwidth) transmitted from the OLT 1. When determining to return into a non-power saving state, the ONU 2 returns into a non-power saving state and transmits a signal to the OLT 1. The ONU 2 determines whether to return by, for example, confirming whether the ONU 2 holds upstream data at a moment of receiving the transmission permission signal. The signal transmitted from the ONU 2 that returns into a non-power saving state to the OLT 1 is a signal requesting the OLT 1 to allocate a bandwidth for transmitting the upstream data held by the ONU 2.

Alternatively, each ONU 2 can autonomously shift into a power saving state when the ONU 2 satisfies a preset condition that can be also detected by the OLT 1. For example, the ONU 2 notifies the OLT 1 of the time and period at and for which the ONU 2 shifts into a power saving state in advance, and shifts into a power saving state at the time of which the ONU 2 notifies the OLT 1.

The bandwidth control unit 14 receives a bandwidth request from each ONU 2 via the PON control unit 12, and determines the bandwidth to be allocated to the ONU 2 that requests the bandwidth allocation (each ONU 2 that transmits the bandwidth request) based on the line utilization state of the ONU 2 that can be acquired from this bandwidth request and the PON control unit 12 and bandwidth parameter information output from the bandwidth-parameter processing unit 16. At this time, the bandwidth control unit 14 calculates the distribution of bandwidths that are to be allocated to the ONUs 2 that request the bandwidth allocation and that include the total value of guaranteed minimum bandwidths for the ONUs 2 that are shifting into a power saving state. The guaranteed minimum bandwidth is a minimum value of the bandwidth allocated to each ONU 2 when the bandwidth control unit 14 receives the bandwidth allocation request from the ONU 2. Normally, this bandwidth is secured for the ONU 2 without being allocated to other ONUs 2 that request the bandwidth allocation.

Furthermore, the bandwidth control unit 14 generates the transmission permission signal indicating a result of determination of the bandwidth to be allocated to each ONU 2, and transmits the transmission permission signal to the ONU 2 via the PON control unit 12.

Figure 2:
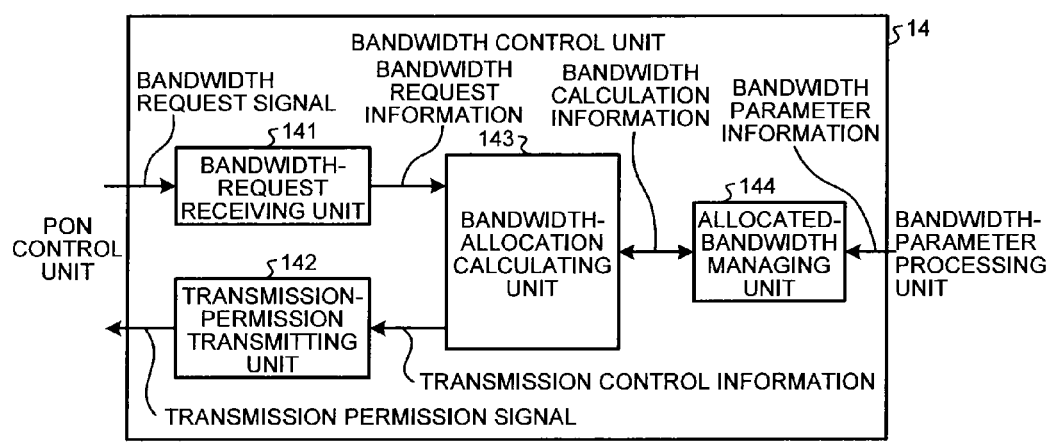
FIG. 2 is a configuration example of a bandwidth control unit according to the first embodiment.

FIG. 2 is a configuration example of the bandwidth control unit 14. As shown in FIG. 2, the bandwidth control unit 14 includes a bandwidth-request receiving unit 141, a transmission-permission transmitting unit 142, a bandwidth-allocation calculating unit 143, and an allocated-bandwidth managing unit 144.

The bandwidth-request receiving unit 141 receives the bandwidth request signal transmitted from each ONU 2 via the PON control unit 12, extracts bandwidth request information from the received signal, and outputs the bandwidth request information to the bandwidth-allocation calculating unit 143.

The transmission-permission transmitting unit 142 generates the transmission permission signal including transmission control information when receiving the transmission control information from the bandwidth-allocation calculating unit 143. The transmission-permission transmitting unit 142 transmits the transmission permission signal to each ONU 2 via the PON control unit 12.

The bandwidth-allocation calculating unit 143 receives the bandwidth request information output from the bandwidth-request receiving unit 141, and receives the bandwidth parameter information output from the bandwidth-parameter processing unit 16 via the allocated-bandwidth managing unit 144. The bandwidth-allocation calculating unit 143 calculates the bandwidth to be allocated to each ONU 2 that has transmitted the bandwidth request information based on these bandwidth request information and bandwidth parameter information. Furthermore, the bandwidth-allocation calculating unit 143 outputs bandwidth calculation information that is a calculation result to the allocated-bandwidth managing unit 144, generates the transmission control information based on the calculation result, and outputs the transmission control information to the transmission-permission transmitting unit 142. The bandwidth-allocation calculating unit 143 distributes all the bandwidths allocatable to the ONU 2, for example, in proportion to ratios of the contract bandwidths (maximum bandwidths) for the respective ONUs 2 each of which has transmitted the bandwidth request signal (allocates a wider bandwidth to the ONU 2 having a wider contract bandwidth). However, the bandwidth calculating method is not limited to this method. Alternatively, the bandwidth-allocation calculating unit 143 can adjust distribution ratios in proportion to request amounts of the bandwidths from the respective ONUs 2. Further, the bandwidth-allocation calculating unit 143 can calculate the bandwidth to be allocated to each ONU 2 by using history information on a result of allocating the bandwidth to the ONU 2 that is information managed by the allocated-bandwidth managing unit 144 in addition to the bandwidth request information and bandwidth parameter information described above. For example, when a plurality of ONUs 2 identical in a service contract content and identical in a bandwidth-allocation request amount are present, the bandwidth-allocation calculating unit 143 allocates a narrower bandwidth to the ONU 2 to which a wider bandwidth is allocated in a previous certain period of time than other ONUs 2. The bandwidth-allocation calculating unit 143 allocates the bandwidth reduced from the bandwidth of the ONU 2 to other ONUs 2 (other ONUs 2 identical in the contract content and the bandwidth-allocation request amount). It is thereby possible to realize fair allocation of bandwidths to the ONUs 2 identical in the contract content.

The allocated-bandwidth managing unit 144 acquires the calculation result of the bandwidth output from the bandwidth-allocation calculating unit 143 and to be allocated to each ONU 2 that has transmitted the bandwidth request information, and holds this information as the history information on the result of allocating the bandwidth to each ONU 2.

The bandwidth-parameter processing unit 16 generates the bandwidth parameter information used when the bandwidth control unit 14 implements a bandwidth control, based on sleep information output from the sleep control unit 15 and user information managed by the user managing unit 17.

Figure 3:
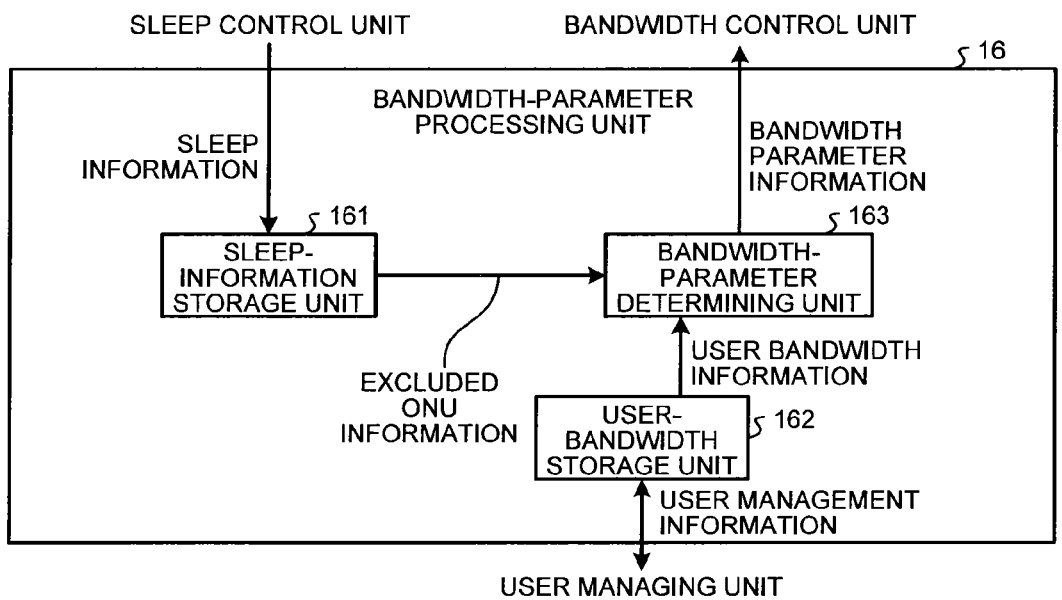
FIG. 3 is a configuration example of a bandwidth-parameter processing unit according to the first embodiment.

FIG. 3 is a configuration example of the bandwidth-parameter processing unit 16. As shown in FIG. 3, the bandwidth-parameter processing unit 16 includes a sleep-information storage unit 161, a user-bandwidth storage unit 162, and a bandwidth-parameter determining unit 163.

The sleep-information storage unit 161 holds the sleep information on each ONU 2 (information indicating whether the ONU 2 is in a power saving state) that is the information output from the sleep control unit 15, and outputs identification information on the ONU 2 in a power saving state that is one of information included in the sleep information to the bandwidth-parameter determining unit 163 as excluded ONU information when the sleep-information storage unit 161 acquires the sleep information. For example, the sleep-information storage unit 161 outputs the excluded ONU information in response to a request from the bandwidth-parameter determining unit 163.

The user-bandwidth storage unit 162 acquires and holds the user information on each ONU 2 managed by the user managing unit 17, and outputs the user information to the bandwidth-parameter determining unit 163 at a predetermined timing as user bandwidth information based on the contract bandwidth.

The bandwidth-parameter determining unit 163 acquires the excluded ONU information and the user bandwidth information from the sleep-information storage unit 161 and the user-bandwidth storage unit 162, respectively, and determines bandwidth control parameters (bandwidth parameters) for each ONU 2 based on these pieces of information. In an operation for determining the bandwidth parameters, the bandwidth-parameter determining unit 163 first grasps the minimum bandwidth (guaranteed minimum bandwidth) to be allocated to each ONU 2 by confirming the user bandwidth information, and calculates the total value of the guaranteed minimum bandwidths for the respective ONUs 2 (all the ONUs 2 in the system). Next, the bandwidth-parameter determining unit 163 detects the ONUs 2 in a power saving state based on the excluded ONU information, calculates the total value of the guaranteed minimum bandwidths for the respective ONUs 2 in a power saving state, and subtracts the total value of the guaranteed minimum bandwidths for the respective ONUs 2 in a power saving state from that of the guaranteed minimum bandwidths for all the ONUs 2. That is, the bandwidth-parameter determining unit 163 calculates the total value of the guaranteed minimum bandwidths for the ONU 2 in a non-power saving state. The bandwidth-parameter determining unit 163 sets an obtained calculation result as bandwidths (guaranteed minimum bandwidths) secured for the respective ONUs 2 in a non-power saving state, and outputs information on the bandwidths to the bandwidth control unit 14 as the bandwidth parameter information.

The bandwidth control unit 14 calculates the bandwidths allocated to all the ONUs 2 connected to the OLT 1 as described above by using the bandwidth parameter information determined by the bandwidth-parameter determining unit 163 of the bandwidth-parameter processing unit 16. The bandwidth control unit 14 includes the transmission control information reflecting the calculation result in the transmission permission signal, and transmitting the transmission permission signal to each ONU 2, thereby controlling the allocation of the upstream bandwidth to each ONU 2.

Figure 4:
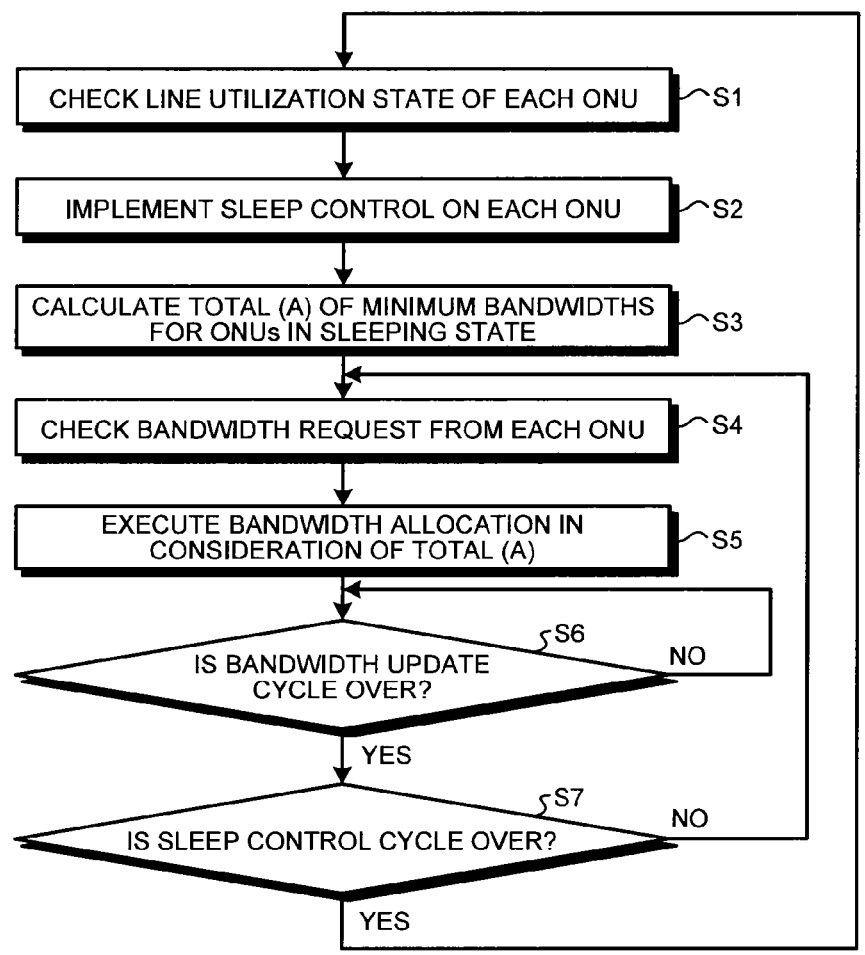
FIG. 4 is a flowchart of an example of a control operation performed by an OLT according to the first embodiment.

FIG. 4 is a flowchart of an example of a control operation performed by the OLT 1 according to the present embodiment, and FIG. 4 is an example of a sleep control operation and a bandwidth control operation performed on each ONU 2.

As shown in FIG. 4, the OLT 1 confirms the line utilization state of each ONU 2 (Step S1). At this Step S1, the sleep control unit 15 acquires the information on the line utilization state of each ONU 2 from the PON control unit 12, and detects the ONU 2 in a state where the ONU 2 has not used the upstream line for a certain period of time. That is, the sleep control unit 15 detects the ONU 2 to be shifted into a power saving state.

Next, the OLT 1 implements the sleep control (Step S2). That is, the sleep control unit 15 instructs the ONU 2 detected by the sleep control unit 15 at the above Step S1 (the ONU 2 that has not used the upstream line for a certain period of time) to shift into a power saving state. At this Step S2, the sleep control unit 15 instructs the PON control unit 12 to transmit, for example, the signal instructing the sleep start time and the sleep time to each ONU 2, and the PON control unit 12 generates and transmits a sleep control signal according to an instruction content. At this time, the PON control unit 12 outputs the information on the ONU 2 shifted into a power saving state and the shifting period to the bandwidth-parameter processing unit 16. Alternatively, the sleep control unit 15 can generate the sleep control signal by itself and can transmit the sleep control signal to each ONU 2 via the PON control unit 12. Furthermore, the sleep start time and the sleep time (a period of time in which the ONU 2 is shifting into a power saving state) can be set either commonly or differently to all the ONUS 2 to shift into a power saving state. For example, the sleep time can set as follows. The sleep time designated to the ONU 2 that has not used the upstream line for a long period of time is set to a value in proportion to an unused time of an upstream line (set to a large value or a small value when the ONU 2 has not used the upstream line for a long period of time), the sleep time is set in proportion to a previous transmitted data amount (set to a small amount when the transmitted data amount is large), or the sleep time is set depending on a type of previously transmitted data (the sleep time of the ONU 2 that has a higher frequency of transmitting data for which a small delay is demanded is set to a smaller amount). Alternatively, the sleep time can be set as a length in proportion to the contract bandwidth (set to a small value when the guaranteed minimum bandwidth is wide).

Next, the OLT 1 calculates the total of the guaranteed minimum bandwidths (minimum bandwidths) for the ONUs 2 in a power saving state (ONUs 2 in a sleep state) (Step S3). At this Step S3, the bandwidth-parameter processing unit 16 grasps the ONUs 2 in a power saving state based on the sleep information on each ONU 2 output from the sleep control unit 15 (the sleep information that indicates whether each ONU 2 is in a power saving state and that is assumed to include information on a period of time in which the ONU 2 is in a power saving state so that the bandwidth-parameter processing unit 16 can always grasp which ONU 2 is in a power saving state). Furthermore, the bandwidth-parameter processing unit 16 confirms the user information on each ONU 2 (assumed to include the information on the guaranteed minimum bandwidth to be allocated to each ONU 2) held by the user managing unit 17, grasps the guaranteed minimum bandwidth to be allocated to each ONU 2, and calculates the total of the guaranteed minimum bandwidths for the respective ONUs 2 in a power saving state. The bandwidth-parameter processing unit 16 further outputs the calculation result to the bandwidth control unit 14. Alternatively, the bandwidth-parameter processing unit 16 can calculate the total of guaranteed minimum bandwidths for the respective ONUs 2 in a non-power saving state. It suffices to determine which is to be calculated according to bandwidth determination procedures adopted by the bandwidth control unit 14.

Next, the OLT 1 checks the bandwidth request from each ONU 2 (Step S4). At this Step S4, the bandwidth control unit 14 confirms the bandwidth request from each ONU 2 received after executing a previous bandwidth request check, and grasps the ONU 2 that requests the bandwidth allocation and a request amount of the ONU 2.

The OLT 1 makes the bandwidth allocation in consideration of the total value calculated at the above Step S3 (Step S5). At this Step S5, the bandwidth control unit 14 determines the upstream bandwidth to be allocated to each ONU 2 based on the total value calculated by the bandwidth-parameter processing unit 16 at the above Step S3 and a confirmation result at the above Step S4. At this time, the bandwidth control unit 14 determines the bandwidth to be distributed to each of the ONUs 2 in a power saving state that request the bandwidth allocation and including the guaranteed minimum bandwidth for each ONU 2. The bandwidth determining method is not limited to any specific method. For example, the bandwidth control unit 14 subtracts the total value of the guaranteed minimum bandwidths for all the ONUs 2 from the entire bandwidths allocated to the system, and distributes the obtained bandwidths to the respective ONUs 2 each of which transmits the bandwidth request (the process so far is similar to the control implemented conventionally). Furthermore, the bandwidth control unit 14 additionally distributes the total value of the guaranteed minimum bandwidths for the ONUs 2 in a power saving state described above to these ONUs 2, and determines the final bandwidth to be allocated to each ONU 2. The bandwidth control unit 14 notifies each ONU 2 that has requested the bandwidth allocation of a determination result via the PON control unit 12. This can thereby release the bandwidths (guaranteed minimum bandwidths) that are conventionally secured for the ONUs 2 in a power saving state and do not transmit upstream data and allocate the bandwidths to the ONU 2 in a non-power saving state. Therefore, it is possible to realize the effective use of the bandwidths.

After performing the above Step S5, the OLT 1 confirms whether a bandwidth update cycle is over (Step S6), and continues a confirming operation until detecting that the bandwidth update cycle is over (NO at Step S6). Furthermore, when the bandwidth update cycle is over (YES at Step S6), the OLT 1 confirms whether a sleep control cycle is over (Step S7). When the sleep control cycle is not over (NO at Step S7), the process proceeds to Step S4 and the OLT 1 again performs the processes at the above Steps S4 and S5. On the other hand, when the sleep control cycle is over (YES at Step S7), then the process proceeds to Step S1, the OLT 1 again performs the processes (the sleep control operation) from the Steps S1 to S4, and performs the bandwidth allocating operation at Steps S4 to S6.

The bandwidth update cycle is a cycle in which the OLT 1 performs the bandwidth allocating operation (corresponding to the above Steps S4 to S5), and that the sleep control cycle is a cycle in which the OLT 1 performs the sleep control operation (corresponding to the above Steps S1 to S4). The sleep control cycle is set so as not to be shorter than the bandwidth update cycle.

In this way, in the communication system according to the present embodiment, the OLT 1 releases the bandwidths (guaranteed minimum bandwidths) secured for the respective ONUs 2 in a power saving state to the ONUs 2 in a non-power saving state when the OLT 1 allocates the bandwidths to the ONUs 2. It is thereby possible to use the bandwidths that continue to be secured for the ONUs 2 in a power saving state and that cannot be used for the ONUs 2 in a non-power saving state according to conventional techniques, and to realize the effective use of the transmission bandwidths.

Alternatively, the OLT 1 can release the guaranteed minimum bandwidths not for all the ONUs 2 in a power saving state but for a part of the ONUs 2 in a power saving state. For example, when the OLT 1 can allocate only the bandwidths smaller than requested amounts to the ONUs 2 that request the bandwidths when allocating the bandwidths thereto after securing the total value of the guaranteed minimum bandwidths for all the ONUs 2 (including those in a power saving state), the OLT 1 releases the guaranteed minimum bandwidths for a part of the ONUs 2 in a power saving state so as to be able to release the bandwidths corresponding to the insufficient bandwidths. In this case, it is also possible to realize the effective use of the transmission bandwidths.

The present embodiment has explained a control method in the optical communication system that time-shares the bandwidths and that distributes the bandwidths to the devices (ONUs) by way of example. However, this control method is also applicable to a communication system that is configured to distribute bandwidths by another method as long as the system implements a bandwidth control so as to guarantee the bandwidths even for the devices in a power saving state.

Second Embodiment

A second embodiment is described next. In the first embodiment, a processing timing of the bandwidth control and that of the sleep control have not been particularly specified. In the present embodiment, a case of synchronizing the timing of the bandwidth control with that of the sleep control is described. In the present embodiment, similarly to the first embodiment, a case of applying a bandwidth control method to a PON optical communication system is described.

Figure 5:
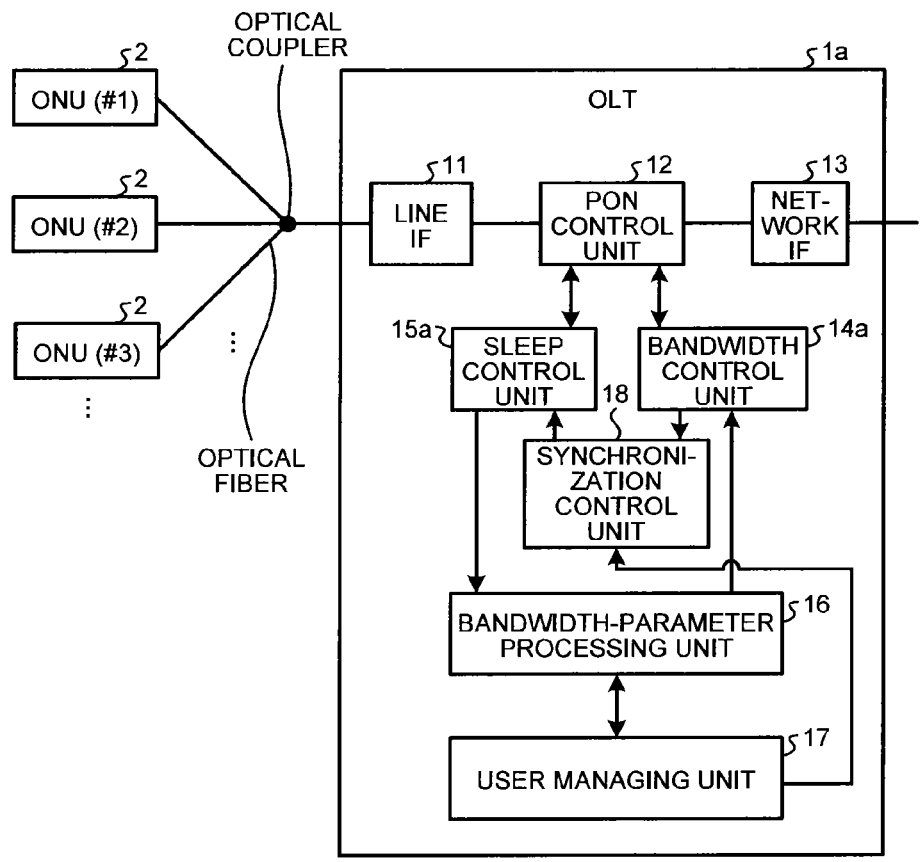
FIG. 5 is a configuration example of a communication system to which a bandwidth control method according to a second embodiment is applied.

FIG. 5 is a configuration example of a communication system to which the bandwidth control method according to the second embodiment is applied. The communication system according to the present embodiment is configured so that an OLT 1*a* replaces the OLT 1 (see FIG. 1) described in the first embodiment. In FIG. 5, elements common to those in the communication system according to the first embodiment shown in FIG. 1 are denoted by like reference signs. In the present embodiment, explanations of elements common to those in the communication system according to the first embodiment will be omitted.

The OLT 1*a* is configured to include a bandwidth control unit 14*a* and a sleep control unit 15*a* that replace the bandwidth control unit 14 and the sleep control unit 15 included in the OLT 1 according to the first embodiment, respectively, and to also include a synchronization control unit 18.

The bandwidth control unit 14*a* outputs a bandwidth-control timing signal indicating that the OLT 1*a* has performed a bandwidth allocating operation on each ONU 2 to the synchronization control unit 18 when the OLT 1*a* performs the bandwidth allocating operation. The bandwidth allocating operation is same as that described in the first embodiment. That is, the bandwidth control unit 14*a* performs the same process as that of the bandwidth control unit 14 included the OLT 1, thereby determining the bandwidth to be allocated to each ONU 2.

Figure 6:
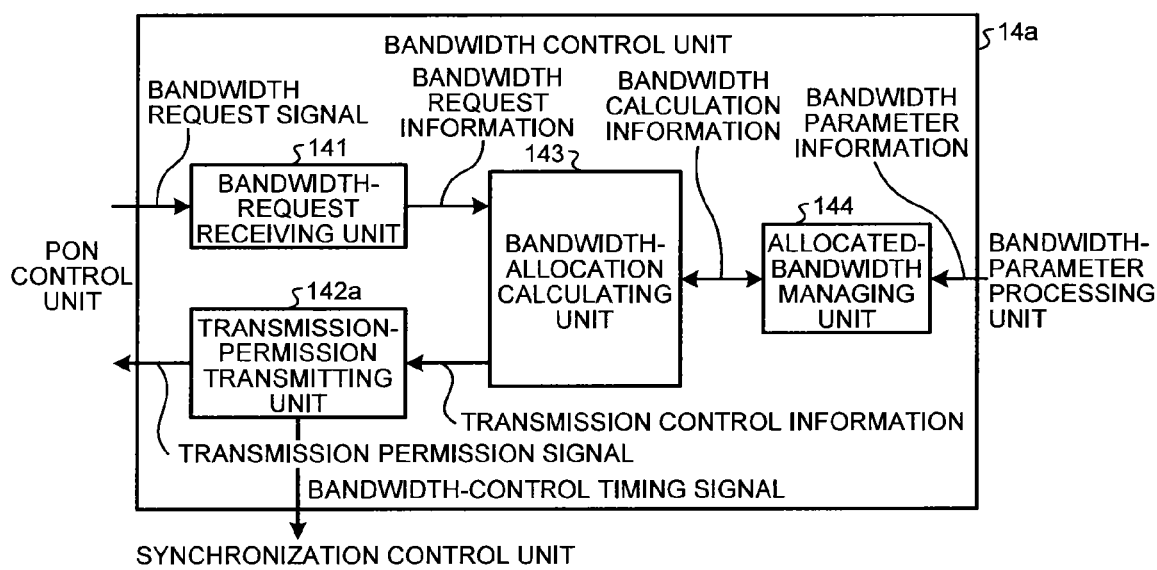
FIG. 6 is a configuration example of a bandwidth control unit according to the second embodiment.

FIG. 6 is a configuration example of the bandwidth control unit 14*a*. The bandwidth control unit 14*a* differs from the bandwidth control unit 14 (see FIG. 2) described in the first embodiment in that a transmission-permission transmitting unit 142*a* replaces the transmission-permission transmitting unit 142, and in that the transmission-permission transmitting unit 142*a* can output the bandwidth-control timing signal indicating that the OLT 1*a* finishes performing the bandwidth allocating operation on each ONU 2 to the synchronization control unit 18 when the OLT 1*a* finishes performing the bandwidth allocating operation.

The sleep control unit 15*a* performs a sleep control operation in response to an instruction from the synchronization control unit 18. The sleep control operation itself is same as that described in the first embodiment. That is, the sleep control unit 15*a* performs the same process as that of the sleep control unit 15 included in the OLT 1, thereby shifting the ONU 2 that satisfies a predetermined condition (for example, the ONU 2 that has not used the upstream line for a certain period of time) into a power saving state.

The synchronization control unit 18 generates a signal having a cycle that is an integer multiple of a cycle of the bandwidth-control timing signal output from the bandwidth control unit 14a based on the bandwidth-control timing signal, and outputs the signal to the sleep control unit 15a as a sleep-control timing signal.

Figure 7:
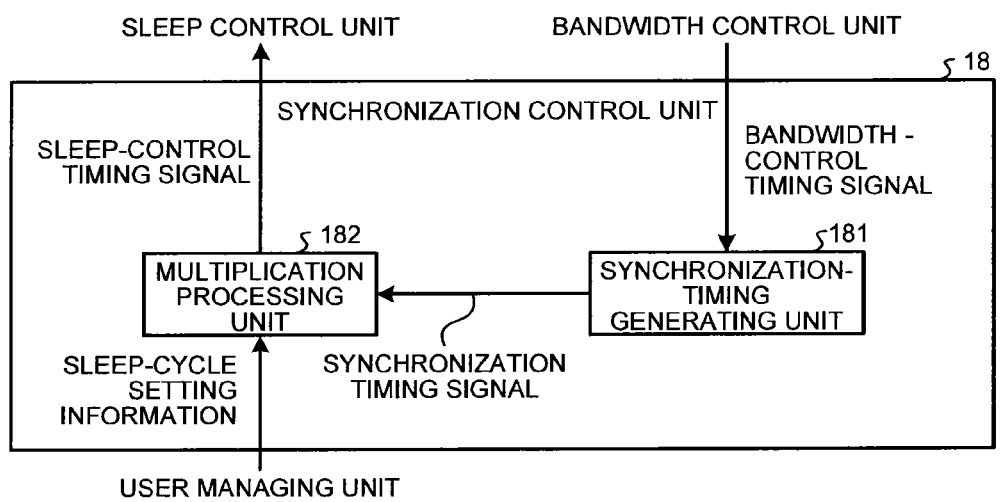
FIG. 7 is a configuration example of a synchronization control unit.

FIG. 7 is a configuration example of the synchronization control unit 18. As shown in FIG. 7, the synchronization control unit 18 includes a synchronization-timing generating unit 181 and a multiplication processing unit 182.

The synchronization-timing generating unit 181 generates a synchronization timing signal synchronized with the bandwidth-control timing signal. The multiplication processing unit 182 generates the sleep-control timing signal instructing execution of the sleep control in a cycle that is an integer multiple of a cycle of receiving the synchronization timing signal based on the synchronization timing signal and sleep-cycle setting information held in the user managing unit 17. The sleep-cycle setting information is information indicating in a cycle of which multiple of the cycle of performing the bandwidth allocating operation (=bandwidth update cycle) a sleep control operation is to be performed, and is assumed to be an integer equal to or larger than 1.

The cycle of executing the sleep control (the sleep control cycle) is thereby synchronized with the bandwidth update cycle, so that it is possible to further improve bandwidth utilization efficiency. Effects achieved when the control method according to the present embodiment is applied to the communication system are described below.

Figure 8:
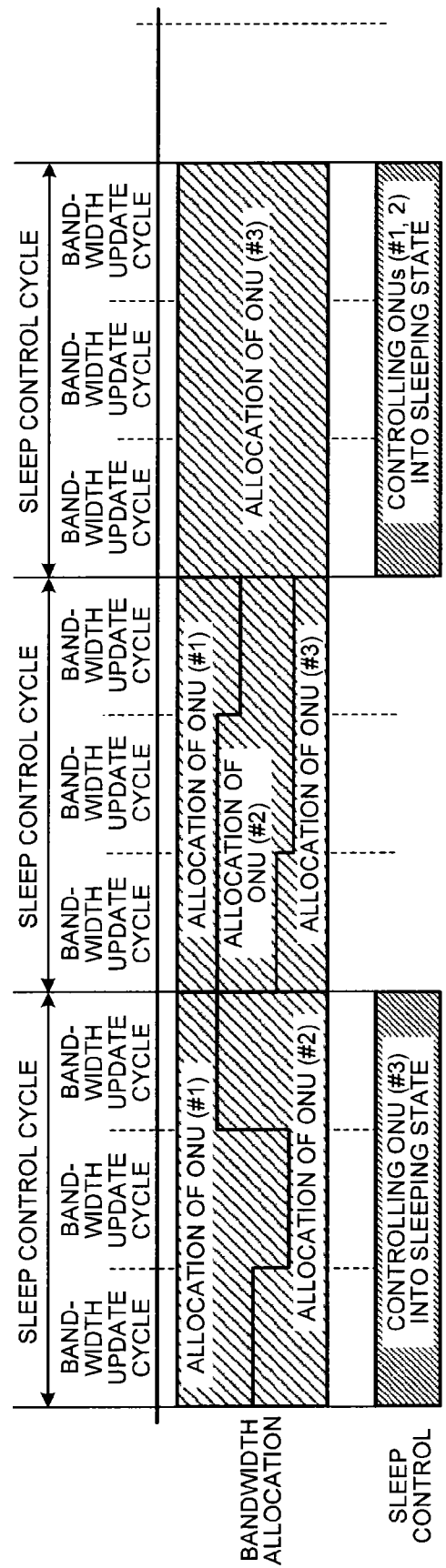
FIG. 8 is an example of a result of bandwidth allocation in a case where a control according to the second embodiment is applied.

FIG. 8 is an example of a result of bandwidth allocation in a case where a control according to the second embodiment is applied. When the control according to the present embodiment is applied, the bandwidth control (the bandwidth allocating operation) and the sleep control are interlocked with each other, and the sleep control operation and the bandwidth allocating operation can be performed synchronously with each other. In an initial (left) sleep control cycle shown in FIG. 8, an ONU#3 is sleep-controlled to shift into a power saving state, and the bandwidth allocation is executed to ONU#1 and ONU#2 (the bandwidth allocation is executed to the ONUs 2 excluding the ONU#3 in a power saving state). A start timing and an end timing of the sleep control cycle match those of the bandwidth update timing. Therefore, as shown in FIG. 8, the OLT 1a can allocate bandwidths to the ONU#1 and ONU#2 over the entire period of time in which the ONU#3 is in sleep. When the start timing and the end timing of the sleep control cycle do not match those of the bandwidth update cycle, the ONU#3 returns into a normal operation state (a non-power saving state) halfway in the bandwidth update cycle. As a result, even when the ONU#3 desires to transmit data (desires the bandwidth allocation) soon after returning into a non-power saving state, the ONU#3 is unable to request the bandwidth allocation until a next bandwidth update cycle and the bandwidth utilization efficiency degrades in an unmatched period of time. Furthermore, the data transmission delay increases. In a second (central) sleep control cycle, the ONUs in a power saving state are not present. Therefore, in each bandwidth update cycle in this sleep control cycle, the OLT 1a allocates bandwidths to all the ONUs. Furthermore, in a third (right) sleep control cycle, the ONU#1 and ONU#2 are in a power saving state. Therefore, in each bandwidth update cycle in this sleep control cycle, the OLT 1a allocates the bandwidth only to the ONU#3.

While FIG. 8 is an example of implementing one sleep control for every third bandwidth control, the frequency of implementing the sleep control can be changed to another multiple by setting.

Figure 9:
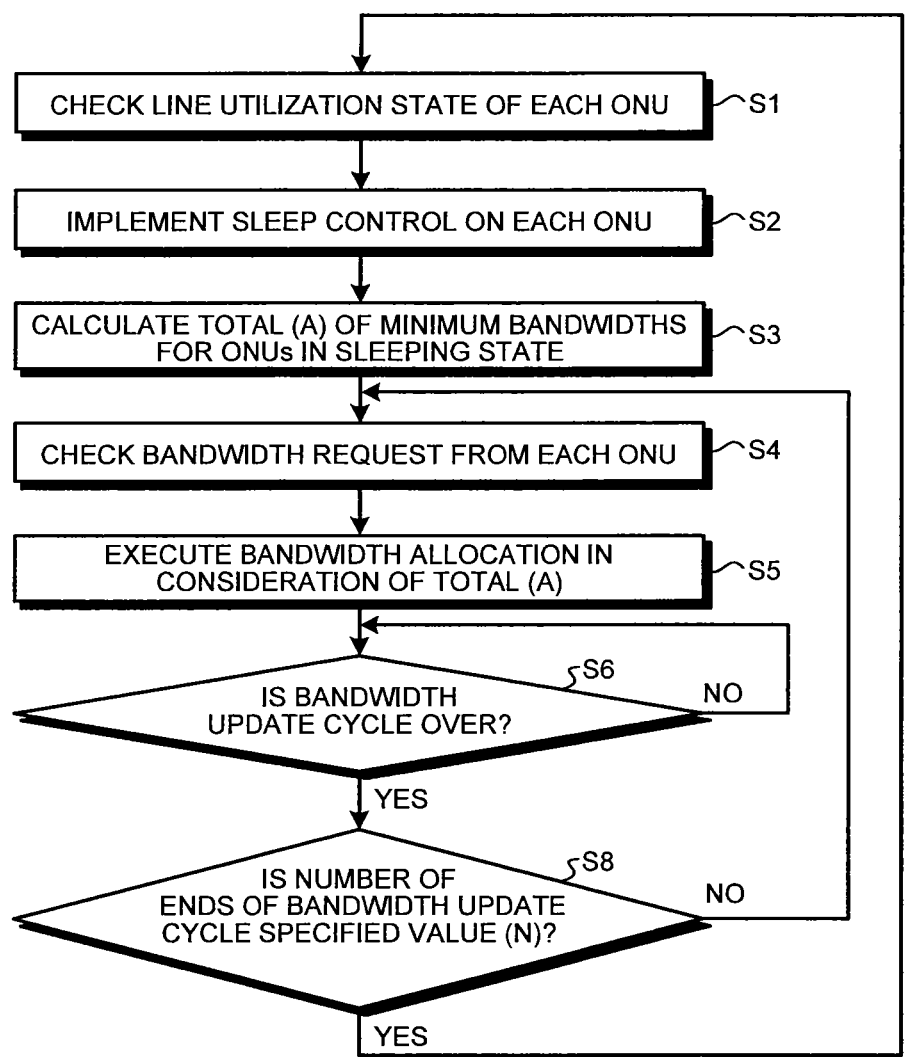
FIG. 9 is a flowchart of an example of a control operation performed by an OLT according to the second embodiment.

FIG. 9 is a flowchart of an example of a control operation performed by the OLT 1a according to the present embodiment, and FIG. 9 is an example of a sleep control operation and a bandwidth control operation performed on each ONU 2.

As shown in FIG. 9, in the control operation according to the present embodiment, Step 8 replaces Step S7 included in the control operation according to the first embodiment (see FIG. 4).

After performing the bandwidth allocating operation at Steps S4 and S5 and confirming whether the bandwidth update cycle is over at Step S6, the OLT 1a confirms whether the number of bandwidth update cycles that are over has reached a specified value (an integer N equal to or larger than 1 indicated by the sleep-cycle setting information described above) (Step S8). When the number has not reached the specified value (NO at Step S8), the process proceeds to Step S4, in which the OLT 1a starts the bandwidth allocating operation. On the other hand, when the number has reached the specified value (YES at Step S8), the process proceeds to Step S1, in which the OLT 1a starts the sleep control operation. The synchronization control unit 18 performs a process for confirming whether the number of bandwidth update cycles that are over has reached the specified value. When detecting that the number of bandwidth update cycles that are over has reached the specified value, the synchronization control unit 18 outputs the sleep-control timing signal to the sleep control unit 15a.

Figure 10:
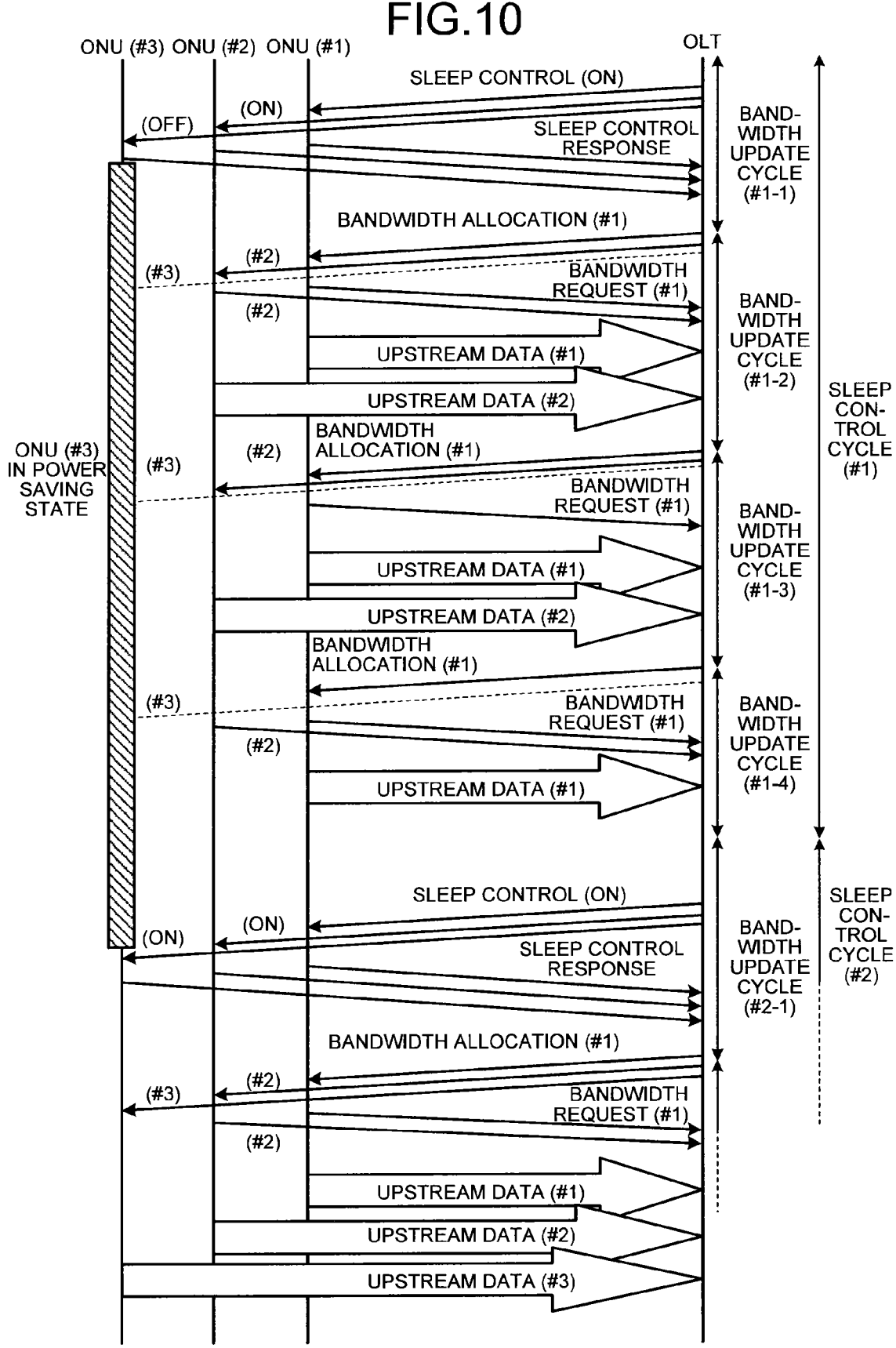
FIG. 10 is a sequence diagram of an example of a control operation performed in the communication system according to the second embodiment.

FIG. 10 is a sequence diagram of an example of a control operation performed in the communication system according to the present embodiment. In this example, when a sleep control cycle #1 starts, the OLT 1a determines to shift the ONU#3 among the control target ONUs into a power saving state and transmits the sleep control signal indicating a determination result to each ONU. In FIG. 10, the signal indicating shifting into a power saving state is expressed as "SLEEP CONTROL (OFF)". The ONU#3 that receives the instruction of shifting into a power saving state transmits a response signal (SLEEP CONTROL RESPONSE) and shifts into a power saving state. Thereafter, before the sleep control cycle #1 ends, the OLT 1a executes the bandwidth allocation to the control target ONU#1 and ONU#2 in response to bandwidth requests from the ONU#1 and ONU#2 whenever the bandwidth update cycle ends. Furthermore, the ONU#3 returns into a non-power saving state when satisfying a predetermined condition.

In this way, in the communication system according to the present embodiment, the OLT 1a performs the sleep control operation at the timing of an integer multiple of the cycle of performing the bandwidth allocating operation (the bandwidth update cycle). It is thereby possible to further improve the bandwidth utilization efficiency from that of the communication system according to the first embodiment.

The present embodiment has explained a method of implementing the control to synchronize the execution timing of the bandwidth control with that of the sleep control in the system that implements the bandwidth control (the bandwidth allocating operation) described in the first embodiment for releasing the guaranteed minimum bandwidths for the ONUs 2 in a power saving state to the ONUs 2 in a non-power saving state. This control method is also applicable to a system that implements a conventional bandwidth control (a control that is not implemented to release the guaranteed minimum bandwidths for the ONUs 2 in a power saving state and to allocate the released bandwidths to other ONUs 2). That is, in the system that implements the conventional bandwidth control, when the sleep control is to be implemented, the communication system is configured to synchronize the execution timing of the sleep control with that of the bandwidth control. It is thereby possible to avoid occurrence of a state where the OLT 1*a* is unable to allocate the bandwidth to the ONU 2 that returns from a power saving state into a non-power saving state until the bandwidth update cycle at that time is over. Therefore, it is possible to improve the bandwidth utilization efficiency.

Third Embodiment

Figure 11:
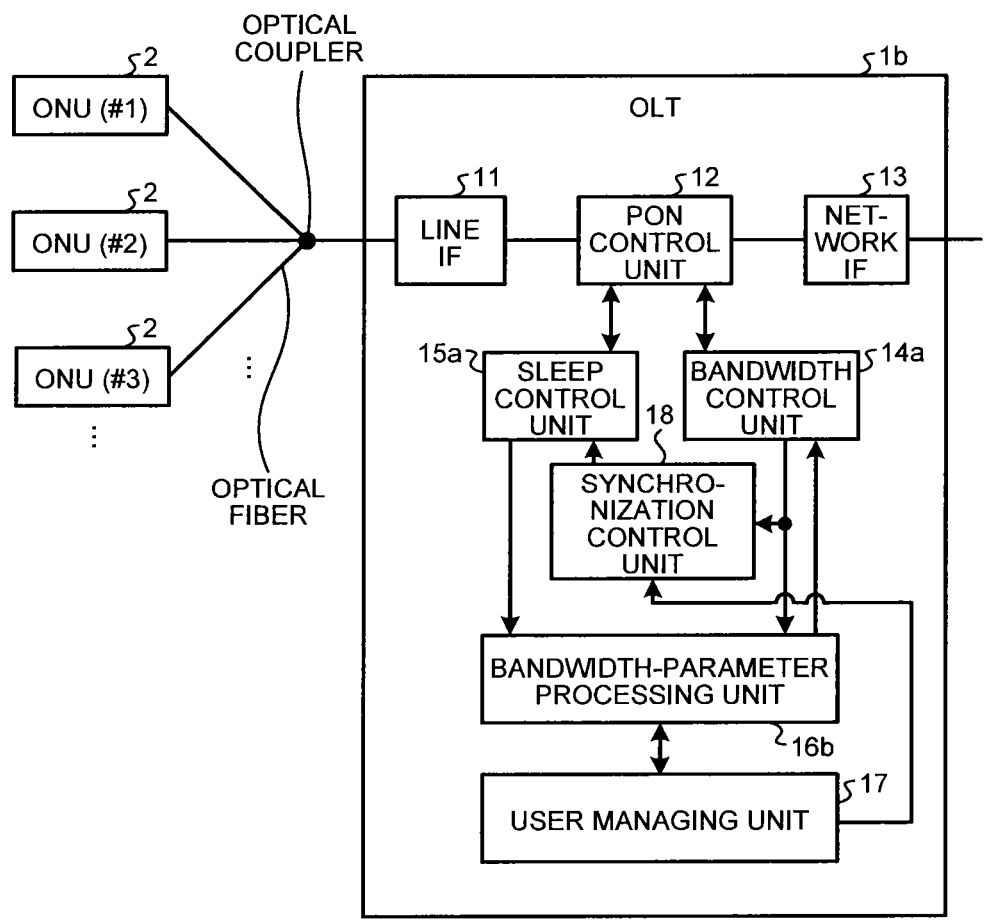
FIG. 11 is a configuration example of a communication system to which a bandwidth control method according to a third embodiment is applied.

A third embodiment is described next. FIG. 11 is a configuration example of a communication system to which a bandwidth control method according to the third embodiment is applied. The communication system is configured so that an OLT 1*b* replaces the OLT 1*a* (see FIG. 5) described in the second embodiment. In FIG. 11, elements common to those in the communication system according to the first or second embodiment (see FIG. 1 or FIG. 5) are denoted by like reference signs. In the present embodiment, explanations of elements common to those in the communication systems according to the above embodiments will be omitted.

The OLT 1*b* is configured so that a bandwidth-parameter processing unit 16*b* replaces the bandwidth-parameter processing unit 16 included in the OLT 1*a* according to the second embodiment.

The bandwidth-parameter processing unit 16*b* receives the bandwidth-control timing signal output from the bandwidth control unit 14*a*, and generates the bandwidth parameter information based on this signal and the sleep information output from the sleep control unit 15*a*. At this time, the bandwidth-parameter processing unit 16*b* generates the bandwidth parameter information so that the bandwidth control unit 14*a* can implement a bandwidth control to correct an influence of excluding the bandwidth allocation accompanying the sleep control implemented so far.

Figure 12:
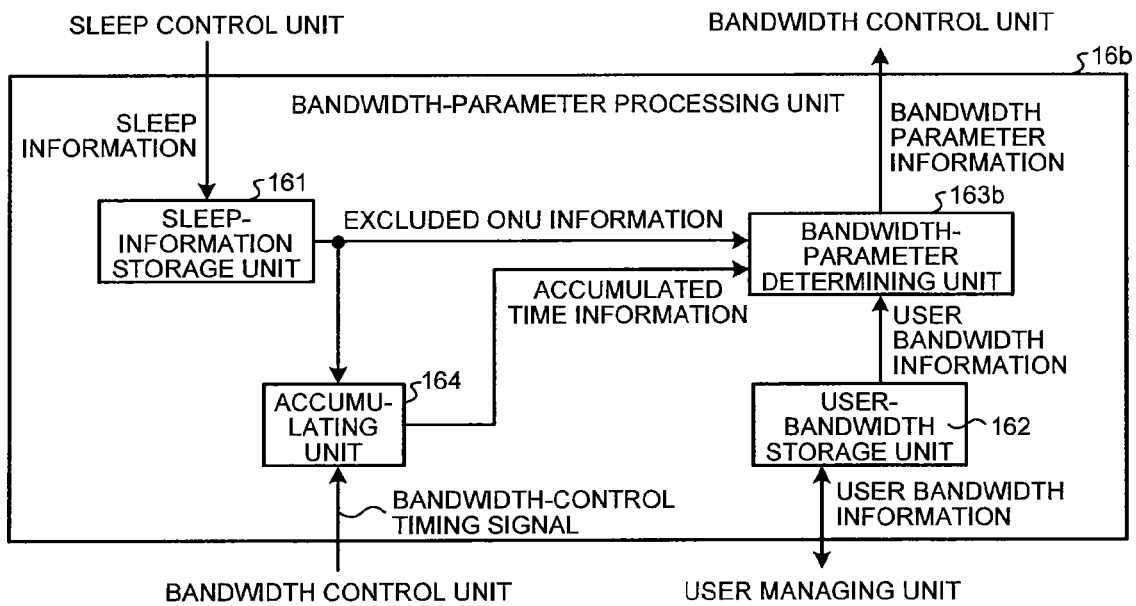
FIG. 12 is a configuration example of a bandwidth-parameter processing unit according to the third embodiment.

FIG. 12 is a configuration example of the bandwidth-parameter processing unit 16*b*. The bandwidth-parameter processing unit 16*b* includes a bandwidth-parameter determining unit 163*b* that replaces the bandwidth-parameter determining unit 163 included in the bandwidth-parameter processing unit 16 (see FIG. 3) described in the first embodiment, and additionally includes an accumulating unit 164.

The accumulating unit 164 accumulates the number of times by which each ONU 2 is excluded from the bandwidth allocation process in the bandwidth update cycles so far based on the excluded ONU information included in the sleep information output from the sleep control unit 15*a* and held by the sleep-information storage unit 161 (identification information on the ONUs in a power saving state) and the bandwidth-control timing signal output from the bandwidth control unit 14*a*, and outputs a result of accumulation to the bandwidth-parameter determining unit 163*b* as accumulated time information. This accumulated time information is information indicating how often each ONU 2 has previously shifted into a power saving state.

The bandwidth-parameter determining unit 163*b* generates the bandwidth parameter information so that the bandwidth control unit 14*a* can allocate bandwidths to the respective ONUs 2 fair for a long time.

Figure 13:
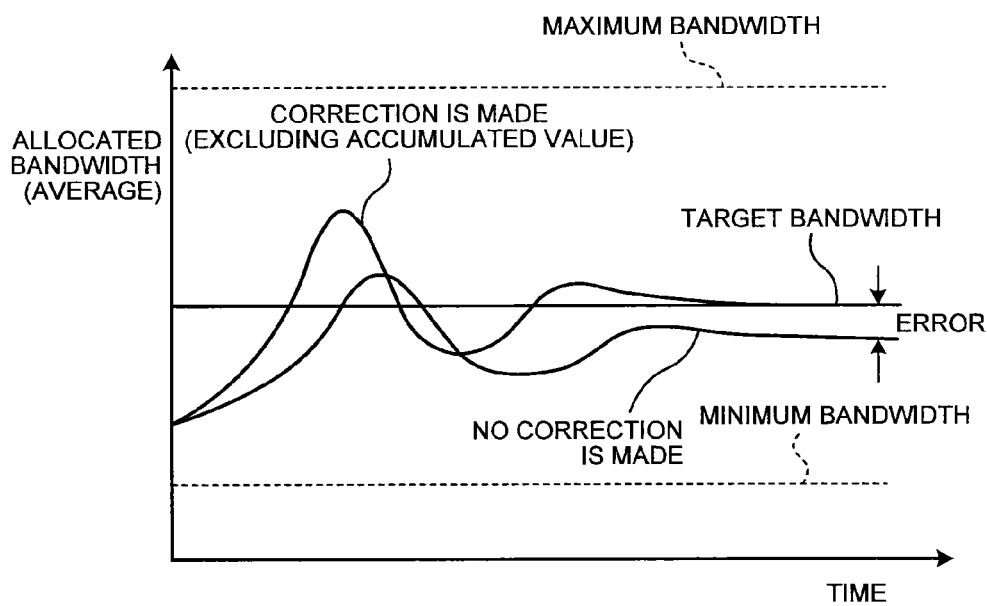
FIG. 13 is an example of a result of bandwidth allocation in a case where a bandwidth control according to the third embodiment is applied.

FIG. 13 is an example of a result of bandwidth allocation in a case where a bandwidth control according to the present embodiment is applied. Effects of the correction explained above are described with reference to FIG. 13. In FIG. 13, the horizontal axis indicates a time and the vertical axis indicates allocated bandwidths.

In the normal communication system, the guaranteed minimum bandwidth (minimum bandwidth) and the maximum bandwidth are set according to the contract bandwidth of each user, and a long-term target bandwidth for each ONU is calculated from the relation with other users. The OLT 1*b* implements the bandwidth control so that an accumulated value of the bandwidth allocated to each ONU converges into the target bandwidth when the OLT 1*b* allocates the bandwidth to each ONU. In the bandwidth control in which the ONUs that shift into a power saving state are not present, it suffices to consider only an accumulated value of time for which each ONU is connected. However, in the bandwidth control implemented in view of the power saving as described in the present specification, the bandwidth is possibly deviated from the target bandwidth as in a case of "NO CORRECTION IS MADE" because of the time for which the allocation is excluded during the power saving. In this case, the fairness is damaged in respect of the bandwidth allocation between the ONUs high in the frequency of being in a power saving state and the ONUs low in the frequency thereof.

However, by carrying out the correction described in the present embodiment, it is possible to converge the allocated bandwidth into the target bandwidth as in a case of "CORRECTION IS MADE" shown in FIG. 13 and to keep the fairness for every user. For example, the bandwidth-parameter determining unit 163*b* compares the numbers of times by which the respective ONUs 2 shift into a power saving state when generating the bandwidth parameter information. Furthermore, the bandwidth-parameter determining unit 163*b* do not exclude the ONUs 2 having a larger number of shifting than those of other ONUs 2 from the bandwidth-control target ONUs 2 even when the ONUs 2 shift into a power saving state (generates bandwidth parameter information while regarding the ONUs 2 in a power saving state as those in a non-power saving state). At this time, when the ONUs 2 differ in contract bandwidth, then the numbers of shifting into a power saving state are corrected based on the respective contract bandwidths, and the corrected number of shifting are compared.

In this way, in the communication system according to the present embodiment, the OLT 1*b* allocates the bandwidth to each ONU 2 while considering the frequency of excluding the ONU 2 in the previous bandwidth control to accompany the sleep control. Specifically, the OLT 1*b* allocates the bandwidth to each ONU 2 while considering the fairness of the bandwidth allocation to each ONU 2 for a long time. It is thereby possible to keep the fairness for every user even in a system configured to implement the bandwidth control while excluding the ONUs 2 in a power saving state.

Fourth Embodiment

A fourth embodiment is described next. In the present embodiment, a communication system that operates while efficiently distributing a processing load in each sleep control cycle is described.

Figure 14:
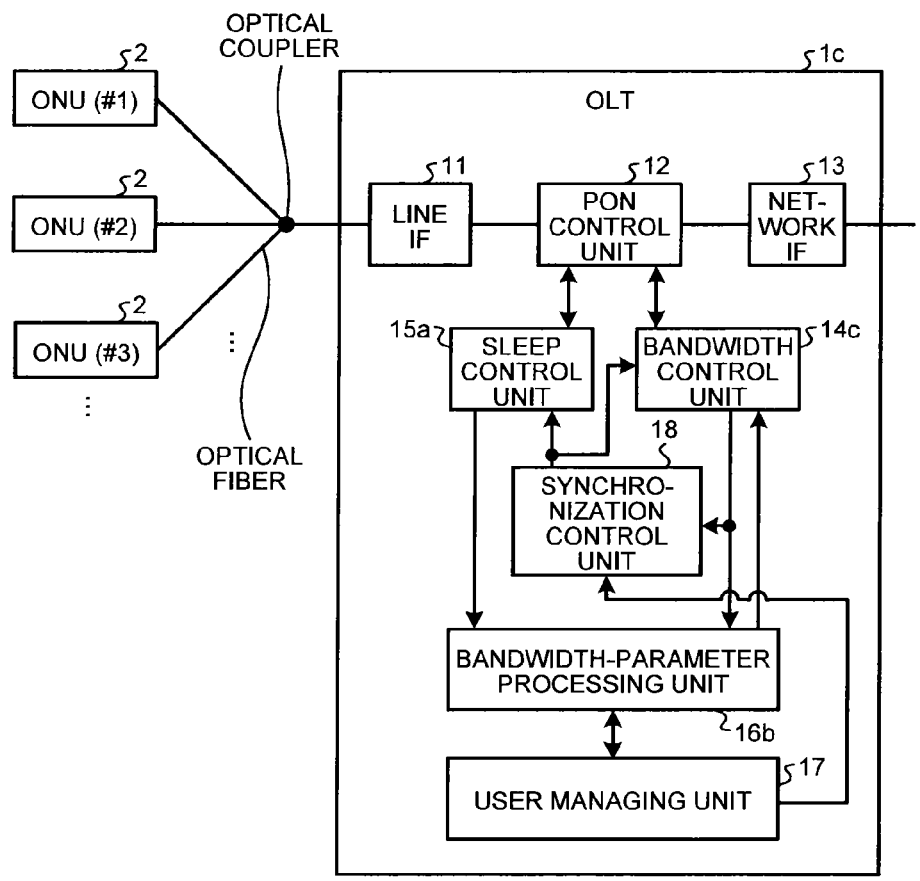
FIG. 14 is a configuration example of a communication system to which a bandwidth control method according to a fourth embodiment is applied.

FIG. 14 is a configuration example of a communication system to which a bandwidth control method according to the fourth embodiment is applied. The communication system is configured so that an OLT 1*c* replaces the OLT 1*b* (see FIG. 11) described in the third embodiment. In FIG. 14, elements common to those in the communication systems according to the above embodiments (see FIG. 1, FIG. 5, and FIG. 11) are denoted by like reference signs. In the present embodiment, explanations of elements common to those in the communication systems according to the above embodiments will be omitted.

The OLT 1*c* is configured so that a bandwidth control unit 14*c* replaces the bandwidth control unit 14*a* included in the OLT 1*b* according to the third embodiment.

The bandwidth control unit 14*c* implements a bandwidth control based on the bandwidth request signal received from each ONU 2 via the PON control unit 12, the bandwidth parameter information output from the bandwidth-parameter processing unit 16b and width the sleep-control timing signal output from the synchronization control unit 18.

Figure 15:
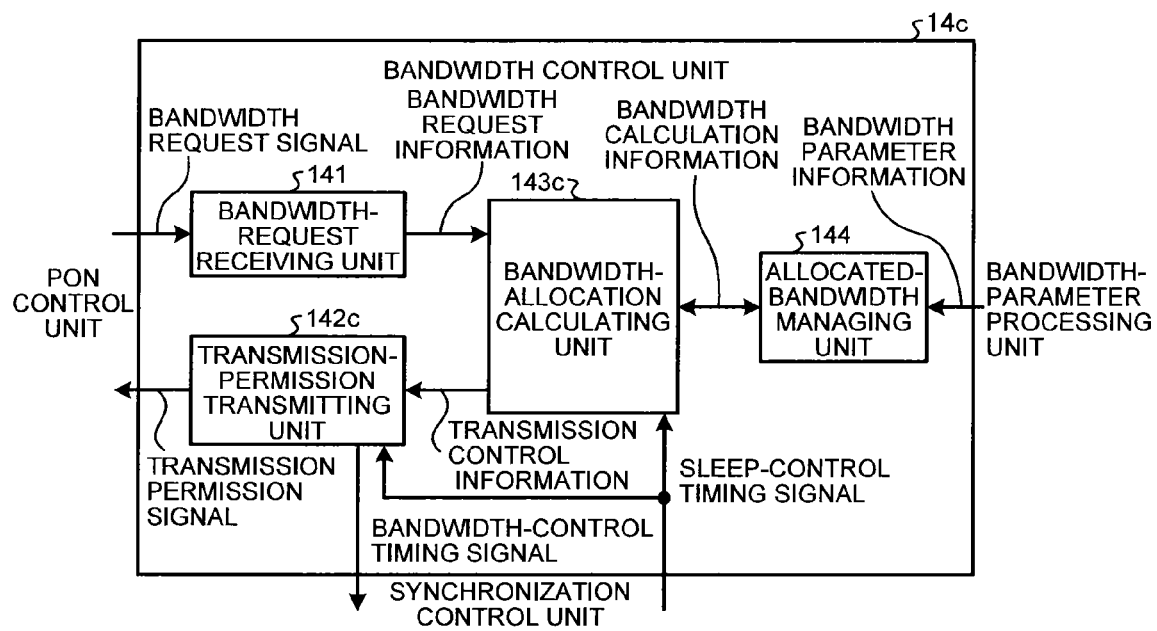
FIG. 15 is a configuration example of a bandwidth control unit according to the fourth embodiment.

FIG. 15 is a configuration example of the bandwidth control unit 14c. The bandwidth control unit 14c is configured so that a transmission-permission transmitting unit 142c and a bandwidth-allocation calculating unit 143c replace the transmission-permission transmitting unit 142a and the bandwidth-allocation calculating unit 143 included in the bandwidth control unit 14a (see FIG. 6) described in the second embodiment, respectively.

When the bandwidth-allocation calculating unit 143c allocates the bandwidth to each ONU 2 for transmitting the bandwidth request signal (corresponding to a REPORT signal in a PON system), the bandwidth-allocation calculating unit 143c allocates the bandwidth thereto so that an arrival timing of the bandwidth request signal transmitted from each ONU 2 falls within a certain range based on the execution timing of the sleep control, generates the transmission control information indicating the allocation result, and outputs the transmission control information to the transmission-permission transmitting unit 142c.

When the transmission-permission transmitting unit 142c receives the transmission control information indicating the result of allocating the bandwidth for transmitting the bandwidth request signal from the bandwidth-allocation calculating unit 143c, the transmission-permission transmitting unit 142c generates the transmission permission signal including the transmission control information and transmits the transmission permission signal to each ONU 2 at a timing synchronized with the sleep control cycle deduced from the sleep-control timing signal. For example, the transmission-permission transmitting unit 142c transmits the transmission permission signal to each ONU 2 in a power saving state at the timing falling within each bandwidth update cycle just before the end of the sleep control cycle shown in FIG. 16. That is, in the OLT 1c according to the present embodiment, the bandwidth-allocation calculating unit 143c of the bandwidth control unit 14c calculates the bandwidth to be allocated to each ONU 2 in a power saving state for transmitting the bandwidth request signal at the end of the sleep control cycle, and performs other processes in a first half of the sleep control cycle or the like. FIG. 16 is an example in which the process for allocating the bandwidth for transmitting the transmission permission signal to each ONU 2 in a power saving state concentrates in the last bandwidth update cycle in each sleep control. As a result, 90% power is used for the bandwidth calculation process in each of these bandwidth update cycles, and 60% power is used for the bandwidth calculation process in other bandwidth update cycles.

The bandwidth-allocation calculating unit 143c is often configured to use a dedicated H/W engine that can operate at a high speed or a high-performance CPU because of the need to make the bandwidth allocation calculation for each of many ONUs 2 in as a short time as about 1 millisecond. Accordingly, if processes concentrate on such a short time, it becomes necessary to provide higher-speed and higher-performance circuits, and this results in increased power consumption and increased device costs.

In this way, in the communication system according to the present embodiment, the OLT 1c implements the control to allocate the bandwidth-request-signal transmission bandwidth to each ONU 2 in a power saving state at the time at which the ONU 2 in a power saving state is possibly activated (shifts into a non-power saving state). Accordingly, although the bandwidth allocation process (a process for allocating the bandwidth-request-signal transmission bandwidth) performed on each ONU 2 in a power saving state concentrates on the end of each sleep control cycle, a processing load can be distributed by performing other processes in time zones other than those in which the bandwidth allocation process is performed. This can prevent power consumption and costs from increasing.

In FIG. 16, which depicts an example of a result of bandwidth allocation when a control according to the present embodiment is applied, an example of concentrating the bandwidth control operation on each ONU 2 in a power saving state at the end of each sleep control cycle is explained. Alternatively, another arrangement such as equal distribution can be made, and the arrangement can be changed depending on the number of ONUs 2 in a power saving state.

As described above, according to the bandwidth control method of the first to fourth embodiments, the guaranteed minimum bandwidth for each ONU 2 in a power saving state can be used for the ONUs 2 in a non-power saving state. Therefore, in the communication system such as the PON communication system for connecting a plurality of slave station devices (ONUs) to the master station device, it is possible to realize improved utilization efficiency of transmission bandwidths. Furthermore, the bandwidth allocation fairness can be kept between slave station devices in a power saving state and slave station devices that are not in a power saving state at that time. It is also possible to reduce circuit costs and the power consumption required for the bandwidth allocation process performed by the master station device.

INDUSTRIAL APPLICABILITY

As described above, the bandwidth control method according to the present invention is advantageous in, for example, a case where a station-side communication device allocates a signal transmission bandwidth to each of subscriber-side communication devices in a communication system configured to include the station-side communication device and a plurality of subscriber-side communication devices connected to the station-side communication device, and the bandwidth control method is particularly suitable to a bandwidth control method for a case where subscriber-side communication devices include those that stop a transmitting operation and shift into a power saving state.

REFERENCE SIGNS LIST

1, 1a, 1b, 1c OLT
2 ONU
11 line IF
12 PON control unit
13 network IF
14, 14a, 14c bandwidth control unit
15, 15a sleep control unit
16, 16b bandwidth-parameter processing unit
17 user managing unit
18 synchronization control unit
141 bandwidth-request receiving unit
142, 142a, 142c transmission-permission transmitting unit
143, 143c bandwidth-allocation calculating unit
144 allocated-bandwidth managing unit
161 sleep-information storage unit
162 user-bandwidth storage unit
163b bandwidth-parameter determining unit
164 accumulating unit
181 synchronization-timing generating unit
182 multiplication processing unit

The invention claimed is:

1. A bandwidth control method in which a first communication device allocates a bandwidth for signal transmission to each of a plurality of second communication devices connected to the first communication device in a communication system including the first communication device and the plurality of second communication devices, the bandwidth control method comprising:
   detecting, by the first communication device, a utilization state for each second communication device;
   determining, by the first communication device, which second communication devices of the plurality of second communication devices satisfy a predetermined condition by comparing the utilization state for each second communication device to a predetermined threshold;
   transmitting, by the first communication device, a sleep control command to each second communication device that satisfies the predetermined condition to enter a power saving state;
   selecting, by the first communication device, control target devices from among the second communication devices that do not satisfy the predetermined condition; and
   determining, by the first communication device, a bandwidth to be allocated to each of the selected control target devices.

2. The bandwidth control method according to claim 1, wherein
   the selecting of the control target devices from among the second communication devices comprises determining the control target devices based on an accumulated value of time for which each of the second communication devices has previously operated in a power saving state.

3. The bandwidth control method according to claim 1, wherein
   a total value of guaranteed minimum bandwidths for control target devices that do not request bandwidth allocation at a certain time, among guaranteed minimum bandwidths preset for all the control target devices, is subtracted from all bandwidths, and remaining bandwidths are distributed to the control target devices that request bandwidth allocation.

4. The bandwidth control method according to claim 1, wherein
   the determining of the bandwidth is performed in a certain cycle, and
   the transmitting is performed in a cycle that is equal to an integer multiple of the certain cycle.

5. The bandwidth control method according to claim 1, further comprising transmitting, by the first communication device, a predetermined signal to the second communication devices in the power saving state at a timing based on a performing timing of the transmitting the sleep control command.

6. The bandwidth control method according to claim 1, wherein the sleep control command includes a start time to enter the power saving state and a duration for the power saving state.

7. A communication system comprising:
   a first communication device; and
   a plurality of second communication devices that transmit data in a bandwidth allocated by the first communication device, wherein
   the first communication device is configured to:
      detect a utilization state for each second communication device;
      determine which second communication devices of the plurality of second communication devices satisfy a predetermined condition by comparing the utilization state for each second communication device to a predetermined threshold;
      transmit a sleep control command to each second communication device that satisfies the predetermined condition to enter a power saving state;
      select control target devices from among the second communication devices that do not satisfy the predetermined condition; and
      determine a bandwidth to be allocated to each of the selected control target devices.

8. The communication system according to claim 7, wherein
   the first communication device is further configured to
      subtract a total value of guaranteed minimum bandwidths for the second communication devices that do not request bandwidth allocation at a certain time among guaranteed minimum bandwidths preset for all of the second communication devices that serve as the control target devices from all bandwidths, and
      distribute remaining bandwidths to the second communication devices that serve as the control target devices and that request bandwidth allocation.

9. The communication system according to claim 8, wherein
   the selection of the control target devices from among the second communication devices includes determining the control target devices based on an accumulated value of time for which each of the second communication devices has previously operated in a power saving state.

10. The communication system according to claim 7, wherein the first communication device is further configured to transmit a signal to each of the second communication devices at a timing based on an executing timing of the sleep control when the first communication device transmits the signal to each of the second communication devices in a power saving state.

11. The communication system according to claim 7, wherein the sleep control command includes a start time to enter the power saving state and a duration for the power saving state.

12. A communication device for allocating a bandwidth to a plurality of opposed devices, the opposed devices being a plurality of second communication devices connected to the communication device, the communication device comprising
   a bandwidth allocating unit, wherein
   the communication device is configured to
      detect a utilization state for each opposed device;
      determine which opposed devices of the plurality of opposed devices satisfy a redetermined condition by comparing the utilization state for each opposed device to a predetermined threshold;
      transmit a sleep control command to each opposed device that satisfies the predetermined condition to enter a power saving state;
      select control target devices from among the opposed devices that do not satisfy the predetermined condition; and
      determine a bandwidth to be allocated to each of the selected control target devices,
   the bandwidth allocating unit is configured to
      subtract a total value of guaranteed minimum bandwidths for the control target devices that do not request bandwidth allocation at a certain time among guaranteed minimum bandwidths preset for all of the control target devices from all bandwidths, and the communication device is further configured to distribute remaining bandwidths to the control target devices that request bandwidth allocation.

13. The communication device according to claim 12, wherein the selecting of the control target devices from among the opposed devices includes determining the opposed devices based on an accumulated value of time for which each of the opposed devices has previously operated in a power saving state.

14. The communication device according to claim 12, further comprising a sleep control unit that is configured to execute a sleep control to shift the opposed devices that satisfy the predetermined condition into the power saving state in a cycle that is equal to an integer multiple of a cycle in which the bandwidth allocating unit executes a control to allocate a bandwidth to each of the control target devices.

15. The communication device according to claim 14, wherein the sleep control unit is configured to transmit a signal to each of the opposed devices in the power saving state at a timing based on a timing of executing the sleep control when the sleep control unit transmits the signal to each of the opposed devices in the power saving state.

16. The communication device according to claim 12, wherein the sleep control command includes a start time to enter the power saving state and a duration for the power saving state.

17. A communication device for allocating a bandwidth to a plurality of opposed devices, the opposed devices being a plurality of second communication devices connected to the communication device, the communication device comprising:
- a bandwidth allocating unit; and
- a sleep control unit, wherein the communication device is configured to
- detect a utilization state for each opposed device;
- determine which opposed devices of the plurality of opposed devices satisfy a predetermined condition by comparing the utilization state for each opposed device to a predetermined threshold;
- transmit a sleep control command to each opposed device that satisfies the predetermined condition to enter a power saving state;
- select control target devices from among the opposed devices that do not satisfy the predetermined condition; and
- determine a bandwidth to be allocated to each of the selected control target devices, the bandwidth allocating unit is configured to execute a bandwidth control to allocate the bandwidth to each of the opposed devices in a certain cycle, and the sleep control unit is configured to execute a sleep control to shift the opposed devices that satisfy the predetermined condition into the power saving state in a cycle that is equal to an integer multiple of the certain cycle.

18. The communication device according to claim 17, wherein the bandwidth allocating unit is further configured to
subtract a total value of guaranteed minimum bandwidths for the control target devices that do not request bandwidth allocation at a certain time among guaranteed minimum bandwidths preset for all of the control target devices from all bandwidths, and the communication device is further configured to distribute remaining bandwidths to the control target devices that request bandwidth allocation.

19. The communication device according to claim 18 wherein the selecting of the control target devices from among the opposed devices includes determining the opposed devices based on an accumulated value of time for which each of the opposed devices has previously operated in a power saving state.

20. The communication device according to claim 17, wherein the sleep control unit is configured to transmit a signal to each of the opposed devices in the power saving state at a timing based on a timing of executing the sleep control when the sleep control unit transmits the signal to each of the opposed devices in the power saving state.

21. The communication device according to claim 17, wherein the sleep control command includes a start time to enter the power saving state and a duration for the power saving state.

* * * * *